(12) United States Patent
Panasik

(10) Patent No.: US 6,668,008 B1
(45) Date of Patent: Dec. 23, 2003

(54) ULTRA-WIDE BAND COMMUNICATION SYSTEM AND METHOD

(75) Inventor: Carl M. Panasik, Garland, TX (US)

(73) Assignee: Texas Instruments Incorporated, Dallas, TX (US)

( * ) Notice: Subject to any disclaimer, the term of this patent is extended or adjusted under 35 U.S.C. 154(b) by 604 days.

(21) Appl. No.: 09/588,086

(22) Filed: Jun. 6, 2000

(51) Int. Cl.[7] ............................................. H04L 27/04
(52) U.S. Cl. ...................... 375/139; 375/295; 342/202
(58) Field of Search ................................. 375/130, 139, 375/140, 146, 296, 295; 342/82, 202; 455/63

(56) References Cited

U.S. PATENT DOCUMENTS 6,384,773 B1 * 5/2002 Martin et al. ............... 342/202

2003/0053555 A1 * 3/2003 McCorkle et al. ........... 375/295
2003/0091122 A1 * 5/2003 Humphreys et al. ......... 375/295

* cited by examiner

Primary Examiner—Amanda T. Le
(74) Attorney, Agent, or Firm—Ronald O. Neerings; Wade James Brady, III; Frederick J. Telecky, Jr.

(57) ABSTRACT

A system and method for generating an ultra-wide band communication signal having data occurring a specific frequencies precisely excised at baseband. The data to be transmitted is transformed into a function of time where the data to be excised can be removed in the time domain. After the data has been successfully removed in the time domain, the data is then transmitted in the frequency domain in which no data is transmitted at the frequencies where the data was precisely excised.

31 Claims, 6 Drawing Sheets

ULTRA-WIDE BAND COMMUNICATION SYSTEM AND METHOD

BACKGROUND OF THE INVENTION

1. Field of the Invention

This invention relates generally to wireless communications, and more particularly to ultra-wide band communication methods and systems.

2. Description of the Prior Art

Ultra Wide Band (UWB) communication systems promise the maximum data rate for dc power expended. These systems are characterized by microwatts of transmitted power, bandwidths of ten times the data rate, digital coding for processing gains of 100 and center frequencies nearly the same as the bandwidth. Known UWB communication systems generally utilize wavelet waveforms having a bandwidth of several GHz.

Present low-power (FCC Part 15, ISM bands) unlicensed, undefined modulation systems can transmit at RF power levels up to 0.7 mw, equivalent to 50 mv/m at a distance of 3 meters. This implies, for example, a transmit power level of −1.25 dBm for a dipole antenna (isotropic). In contrast, intentional radiation RF power levels outside of the ISM bands is limited above 960 MHz to 500 uv/m (−21.25 dBm).

Because of their very small level of transmitted power, UWB systems utilize the VHF and UHF bands for optimal in-building communication. Unfortunately, above 960 MHz, there are two bands which are extremely sensitive to interference. These are the 1220 MHz and 1575 MHz global positioning system (GPS) satellite link communication frequencies.

As UWB communication systems continue to develop, it is foreseeable that new applications may necessitate consideration of intentional radiation levels below the present class B unintentional level of 75 microwatts per GHz of bandwidth. These applications, however, may conflict with the needs of present "owners" of commonly used bandwidth, even when associated radiation levels are limited in range to 10–50 meters. Present "owners" may include, for example, cellular phone system operators communicating at frequencies such as 825–869 MHz and 1900 MHz and global positioning system (GPS) operators communicating at frequencies such as 1225 MHz and 1575 MHz. Therefore, a need presently exists for a low-power UWB communication system that can be operated in a manner that is capable of excising the potential transmitted interference among simultaneous communication system operators.

Present techniques for removing transmitted signals in the foregoing communication bands are limited to physically notching the transmit antenna to minimize its power at the frequencies to be excised and/or inserting RF notch filters between the transmitter and the transmit antenna. These techniques are somewhat limited in that notches presently can only be applied to laboratory prototype transmit antennas at lower center frequencies. Further, use of notches does not completely suppress the waveform, but simply changes the radiation characteristics, for example, from directional to omni-directional. Although precise, narrow band RF notch filters are undesirably large and lossy.

In view of the foregoing discussion, a need exists in the wireless communications art for a low-cost, low-power, highly efficient UWB communication system capable of selectively removing transmissions, without use of notch filters or frequency shifting techniques, in designated bands that are narrow relative to the full bandwidth being utilized by the UWB communication system. Such a communication system would be very advantageous since it would be capable of short range, indoor communication without concern for signal losses associated with objects, e.g. walls, doors, windows, appliances, or other structures, due to reflections and the like, when operating within or near the broadcast frequency band (i.e., about 100–200 MHz). Such a communication system would thus be able to take advantage of the "sweet spot" range of frequencies (about 100–200 MHz) normally associated with indoor, battery operated devices.

SUMMARY OF THE INVENTION

The present invention is directed to a low-cost, low-power, highly efficient ultra-wide band (UWB) communication system capable of selectively removing transmissions, without use of frequency notch filters or frequency shifting techniques, in designated bands that are narrow relative to the full bandwidth being utilized by the UWB communication system. One preferred embodiment of the present invention comprises an expander or spreader to process an incoming stream of data in the frequency domain into a waveform that is a function of time. One embodiment implements this expansion process by multiplying, via a mixer, the incoming stream of data with a chirp waveform from a chirp generator, thereby creating an output waveform in which each frequency is associated with a specific unit of time. Most preferably, each frequency will be associated with no more than a single unit of time. The processed waveform that is a function of time is then passed through a time notching process (as contrasted with known frequency notching techniques discussed above) in the time domain by synchronizing the processed waveform with a series of notches implemented in the time domain. In this manner, it is relatively easy to generate the time domain pulses necessary to very accurately excise any transmission frequencies desired to be excised from the transmitted signal. This technique is especially useful where the frequency bands to be excised are narrow relative to the full transmission bandwidth.

The present invention provides various technical advantages. In one aspect of the invention, a technique provides for a maximum limit on peak transmitter power such that a 100× factor in range may be attained in a quiet (i.e. home) environment, thereby enabling a transmitter to back-off to the minimum RF power for a given bit error rate.

In another aspect of the invention, a technique provides an advantage when used in the same environment as unlicensed direct sequence (DS) radios. This technique provides a 20 dB processing gain (PG=100) with −1.25 dBm peak power, giving an effective 19.75 dBm transmitted power. Present ISM band unlicensed DS radios are limited to 8 dBm with +10 dB gain, effectively providing 18 dBm transmitted power. The present invention therefore has a 1.75 dB advantage over unlicensed DS radios in the ISM bands.

In yet another aspect of the invention, a technique enables several users to operate in the same frequency range without frequency channelization using several expensive IF filters, e.g. placing resonators at respective shunt elements in a lattice structure in an attempt to create a narrow-band notch.

In still another aspect of the invention, a technique enables precise ("brick wall") notching of many forbidden frequency bands.

In another aspect of the invention, a technique provides precise notching in association with signal processing (DSP) at baseband.

In yet another aspect of the invention, a technique enables near perfect (steep, minimal transition) excision of selected transmission frequencies.

In still another aspect of the invention, a technique enables implementation of a low-cost, low-power UWB communication system using known building blocks, e.g. reasonably good RF transceiver that does not require a high performance local oscillator (phase noise relaxation); chirp modulation; and demodulation circuits to implement spread-spectrum, such as an oversampled digital correlator, or SAW correlator, that does not require synchronization.

BRIEF DESCRIPTION OF THE DRAWINGS

Other aspects and features of the present invention and many of the attendant advantages of the present invention will be readily appreciated as the same become better understood by reference to the following detailed description when considered in connection with the accompanying drawings in which like reference numerals designate like parts throughout the figures thereof and wherein.

While the above-identified drawing figures set forth alternative embodiments, other embodiments of the present invention are also contemplated, as noted in the discussion. In all cases, this disclosure presents illustrated embodiments of the present invention by way of representation and not limitation. Numerous other modifications and embodiments can be devised by those skilled in the art which fall within the scope and spirit of the principles of this invention.

DETAILED DESCRIPTION OF THE PREFERRED EMBODIMENTS

Figure 1:
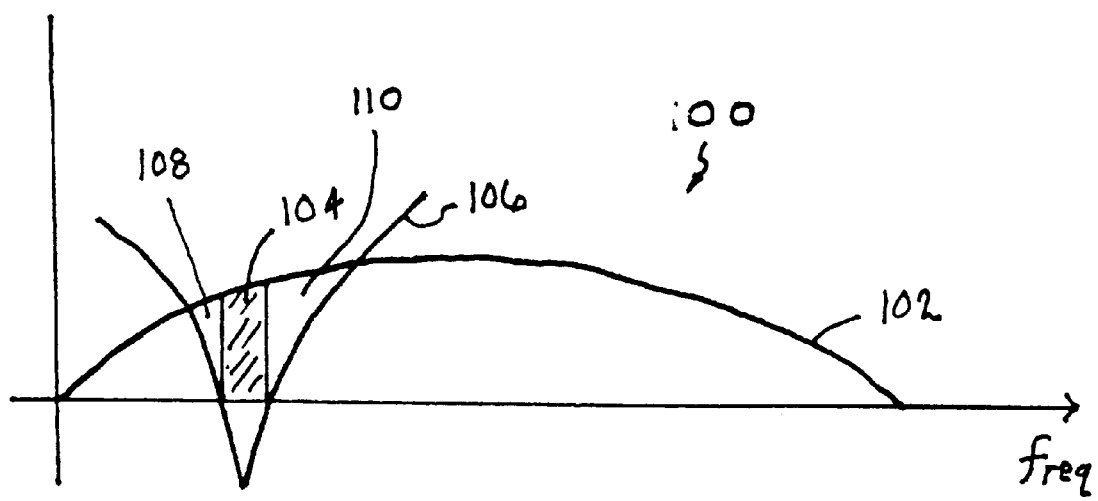
FIG. 1 is a diagram illustrating characteristics of a common RF notch filter known in the art.

FIG. 1 is a diagram illustrating the frequency characteristics of a common RF notch filter 100 known in the art. A communication signal waveform 102 covers a wide range of frequencies in which it is desired to eliminate signal transmissions in a particular frequency band 104. Present frequency notch filters are generally costly to implement and are also lossy in the pass band frequencies due to limitations regarding known methods of physically implementing frequency notch filters. Even when implementing frequency notch filters using modern digital techniques, it is not practical or even possible to realize near perfect signal notching to excise a particular frequency or band of frequencies at baseband. Therefore, a typical frequency notch filter will create a notch somewhat exemplified by the notch 106. It is seen that although it is desired to excise only those frequencies within the frequency band 104, other frequencies 108, 110 are also excised. This is undesirable since some of the valid transmission data occurring at the other frequencies 108, 110 will be lost.

Figure 2:
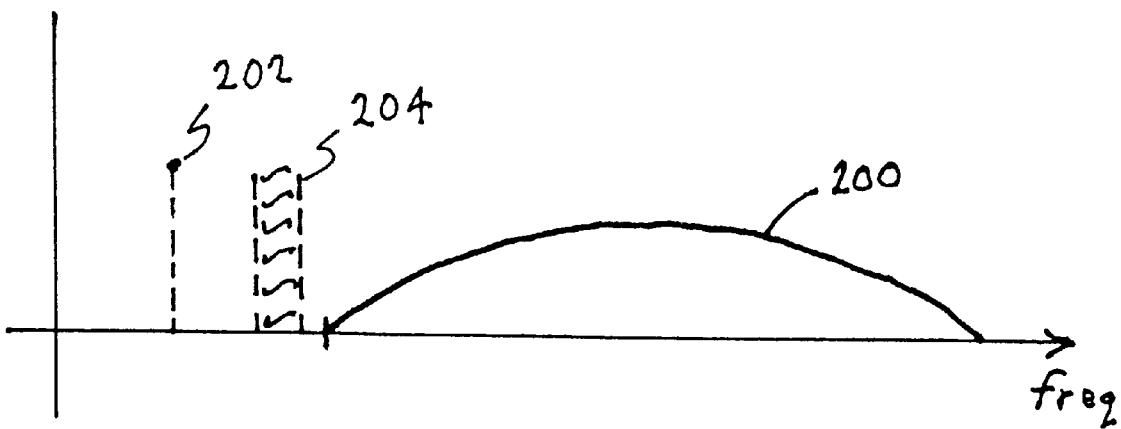
FIG. 2 is a diagram illustrating a frequency shifting technique for excising a band of frequencies.

FIG. 2 is a diagram illustrating a frequency shifting technique for excising a band of frequencies 200. This technique is useful where it is understood and accepted that many frequencies lying outside specific narrow frequency bands are excised, even though only specific narrow frequency bands necessarily are required to be excised. Importantly, this technique may not be useful where the resulting operating range of frequencies will fall too high in the frequency spectrum, due to additional propagation loss which is proportional to $f^2$.

Figure 3:
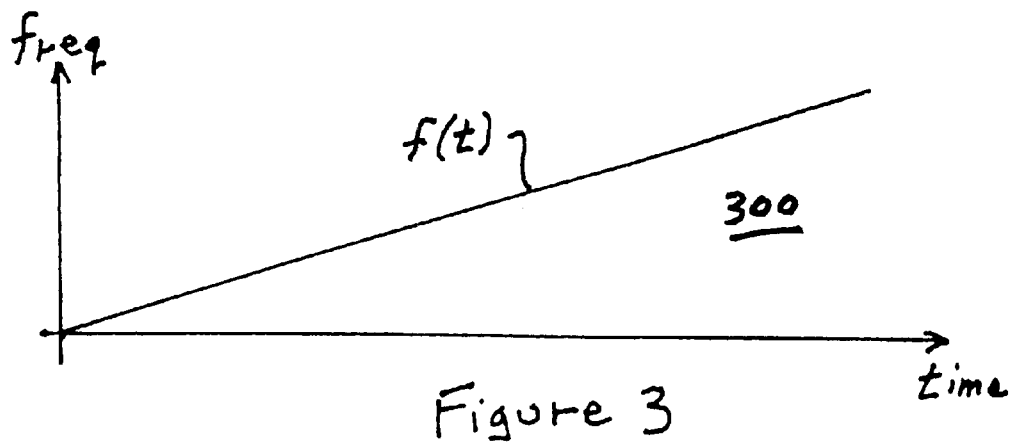
FIG. 3 is a diagram illustrating a transform function in which frequency is a linear function of time, $f(t)$.
Figure 4:
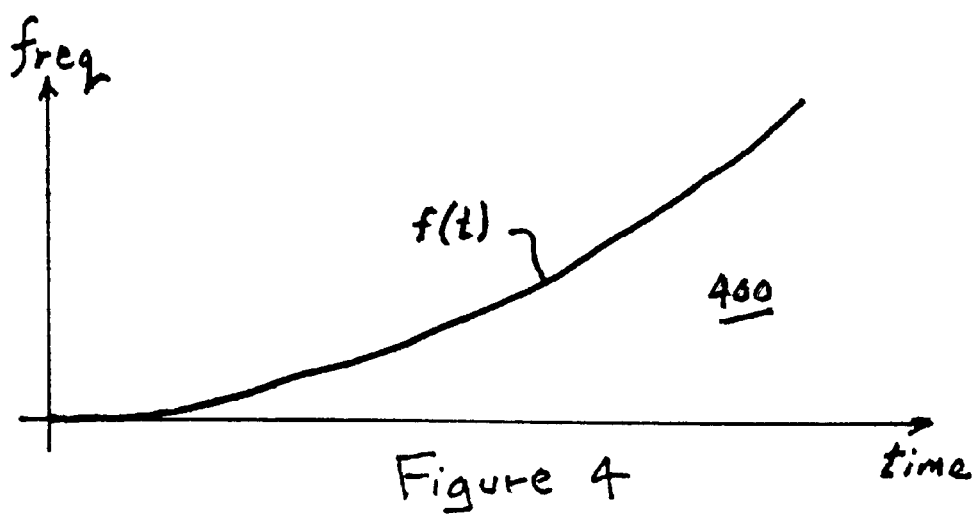
FIG. 4 is a diagram illustrating a transform function in which frequency is a non-linear function of time, $f(t)$.
Figure 5:
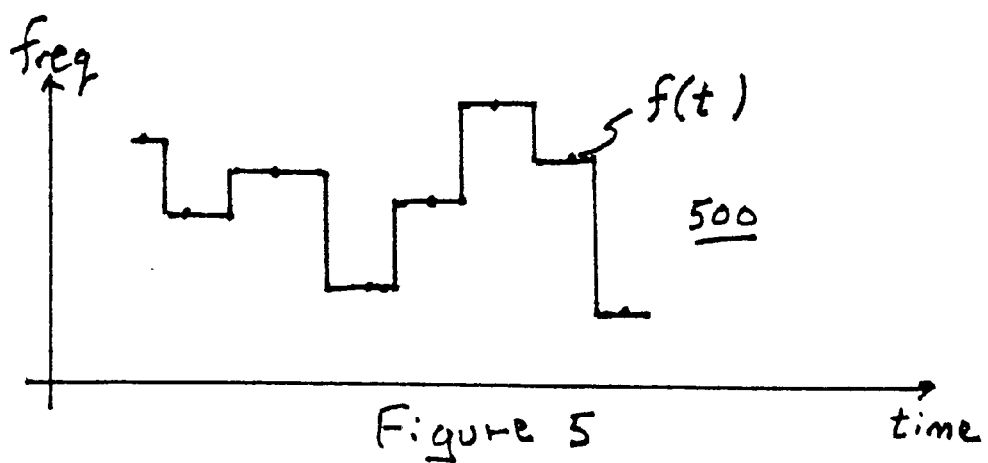
FIG. 5 is a diagram illustrating a transform function in which frequency is a non-continuous function of time, $f(t)$.

FIG. 3 is a diagram illustrating a transform function 300 in which frequency is a linear function of time, $f(t)$. FIG. 4 is a diagram illustrating a transform function 400 in which frequency is a non-linear function of time, $f(t)$. FIG. 5 is a diagram illustrating a transform function 500 in which frequency is a discrete function of time, $f(t)$. Any of the transform functions 300, 400, 500 can be implemented in association with a requisite expander or spreader to generate a communication signal in which a frequency waveform is a function of time. As described above, precise excision of particular frequencies or frequency bands is not practical or even feasible at baseband due to physical limitations associated with known frequency notching techniques and filters. Precise excision of specific frequencies or frequency bands is, however, practical and realizable in the time domain. Therefore, generating a waveform at baseband that is a function of time provides a way to implement precise excision of specific frequencies or frequency bands while preserving transmission data at every other frequency within the baseband. A method and structure for excising specific frequencies and/or frequency bands in the time domain is described herein below with reference now to FIG. 6.

Figure 6:
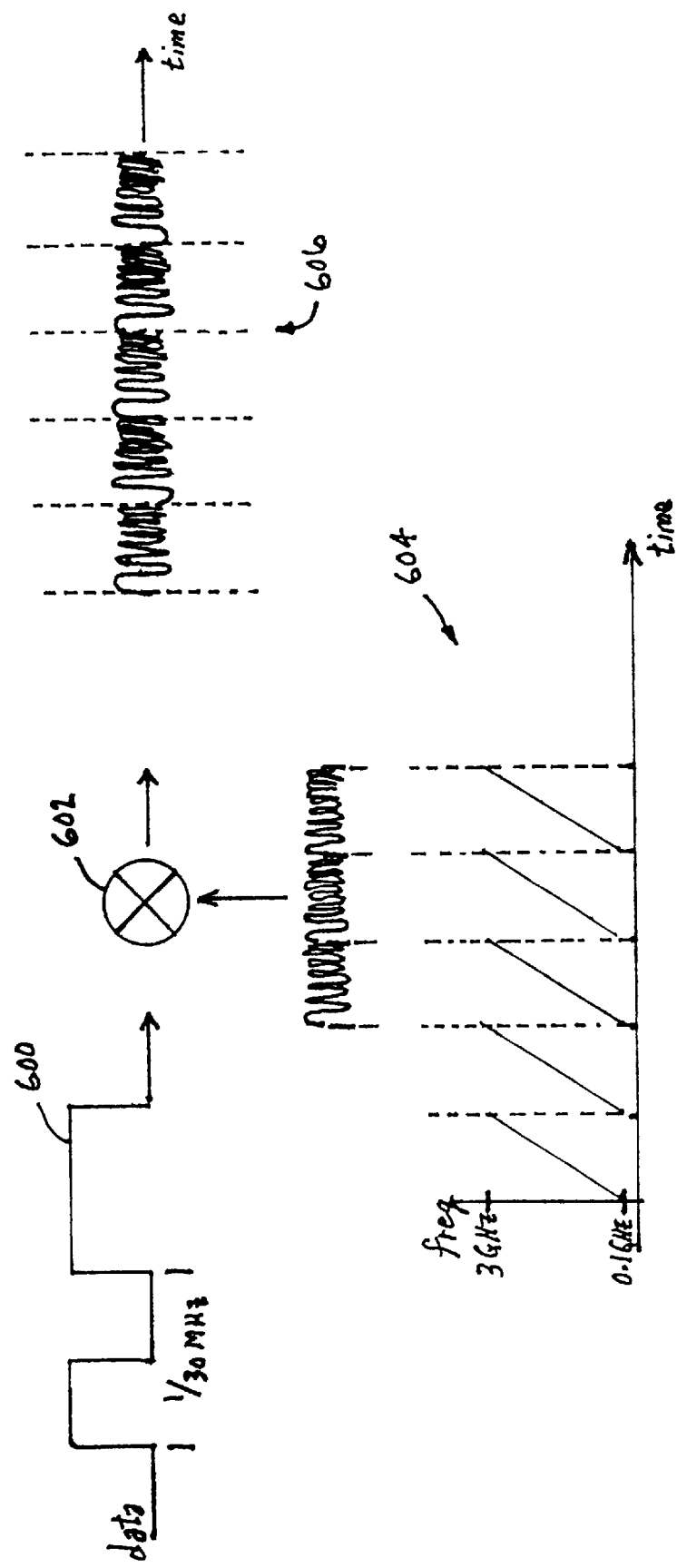
FIG. 6 is a diagram illustrating operation of an expander.

FIG. 6 is a diagram illustrating operation of an expander. Waveform 600 is a narrow band signal comprising pulses transmitted at 30 MHz. Each data pulse therefore is transmitted in a time interval of 0.03$\overline{3}$ usec (1/30 MHz). The waveform 600 is one input to a mixer 602. A transform generator 604 such as a chirp generator generates a signal that is another input to the mixer 602. When used in association with the present invention, any transform function can be used so long as the expander generates a waveform that is a function of time. This function need not be monotonic, linear, or continuous. The present invention is not so limited however, and it shall be understood that a spreader can also be used to generate a waveform that is a function of time under appropriate circumstances well known to those skilled in the art. A chirp generator is thus exemplified herein only for purposes of explanation of the principles of the present invention. The chirp generator then generates a signal such as depicted in FIG. 3 in which frequency is a function of time synchronized to the input data rate and that is repeated every 0.03$\overline{3}$ usec. In this way, the waveform 600 is transformed into a data stream 606 in which the transmitted data is represented as a function of time.

Figure 7:
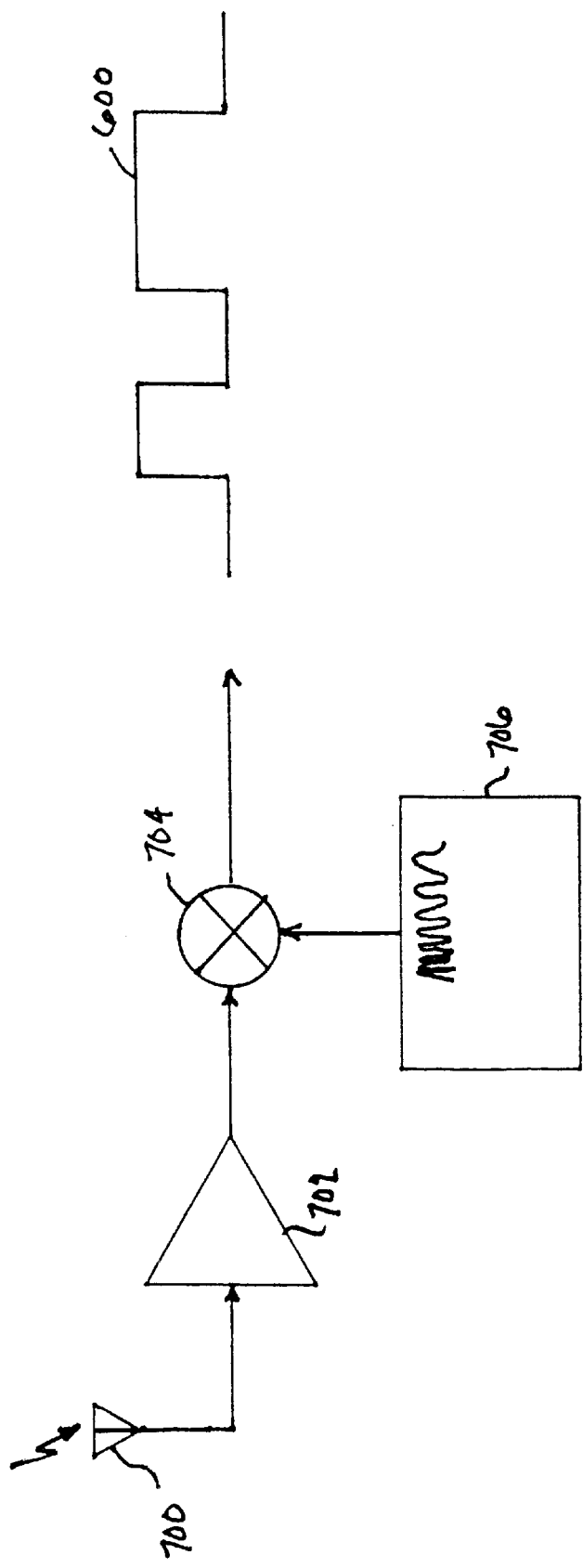
FIG. 7 is a diagram illustrating operation of a compressor.

FIG. 7 is a diagram illustrating operation of a compressor. Although not necessary to implement the present invention, a compressor operates to recover the original transmission waveform that was transformed by the expander or spreader as described above. Thus, a receiver using a compressor will be able to recover the original waveform 600 at baseband. The transformed waveform (data stream 606) is received via a receiver antenna 700, sent through a buffer amplifier 702 and then to a mixer 704 where the data stream 606 is mixed with a signal generated by an inverse transform generator 706 such as an inverse chirp generator.

Both the expander and compressor described with reference to FIGS. 6 and 7 are associated with a pair of waveform functions. The expander, for example, comprises a function of frequency H($f$) whose magnitude is unitary over the frequency range of interest. The expander also comprises a quadratic phase function $\phi(f)$ in which slope varies as a function of frequency. Similarly, the compressor also has an |H($f$)| function that is unitary. In addition, the compressor has a quadratic phase function $\phi(f)$ in which slope varies inversely as a function of frequency. Thus, when h(t)$_E$ (expander) is convolved with h(t)$_C$ (compressor) at the receiver, i.e. h(t)$_E$*h(t)$_C$⇋H$_E$($f$)·H$_C$($f$), then $$|H_E(f)| \cdot |H_C(f)| \angle (\phi_E(f) + \phi_C(f)) = 1 \angle 0°, \quad (1)$$

and the original waveform is recovered at the receiver.

Figure 8:
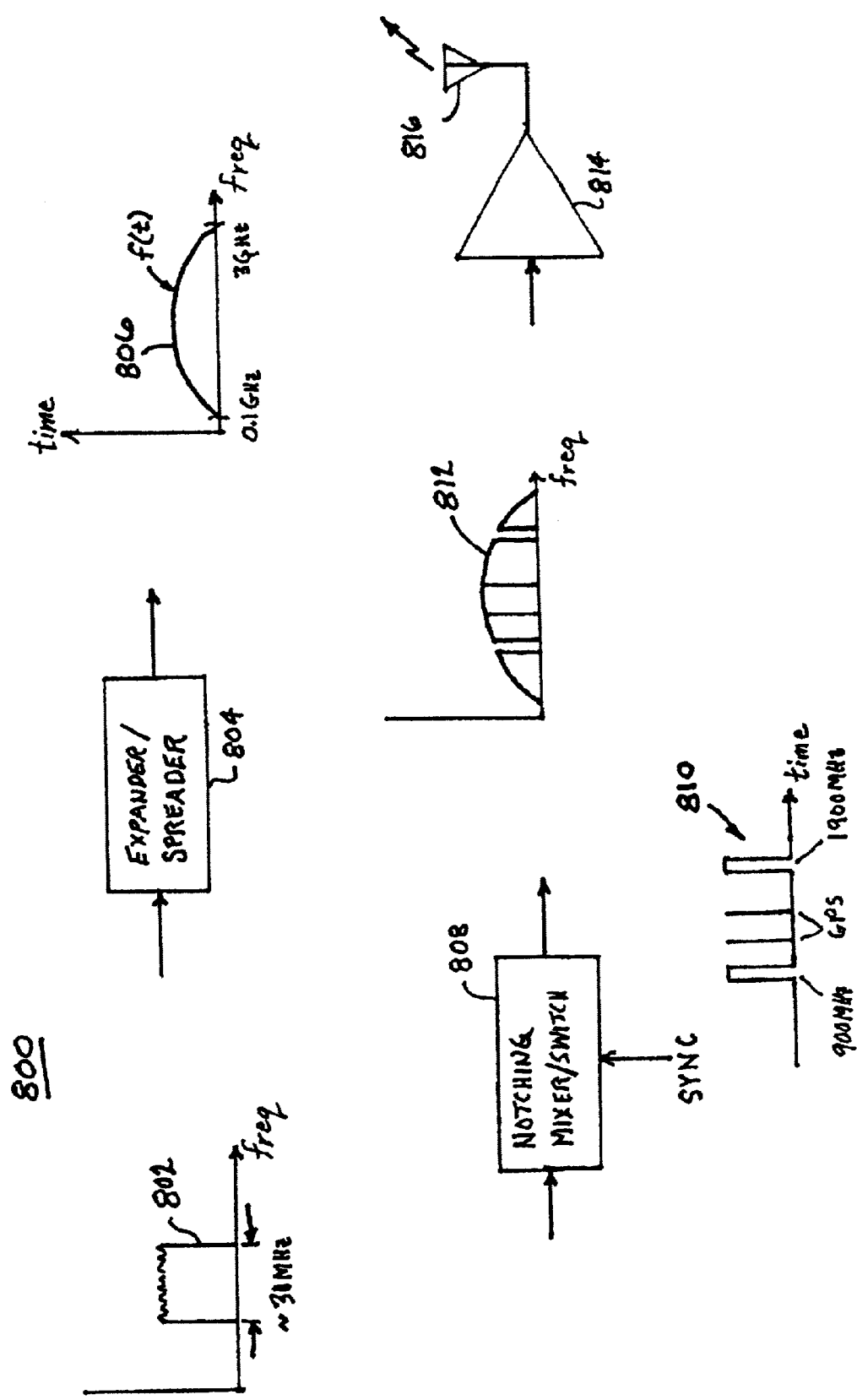
FIG. 8 is a diagram illustrating a system and method of implementing a low-cost, low-power ultra-wide band communication system according to one embodiment of the present invention.

FIG. 8 is a diagram illustrating a system and method 800 of implementing a low-cost, low-power ultra-wide band (UWB) communication system according to one embodiment of the present invention. A data signal 802 is first seen generated over a 30-MHz frequency band. This data signal 802 is passed through an expander 804 as described herein above. Although described in association with an expander 804, those skilled in the art will readily appreciate the present invention can be implemented using either hardware or software techniques to implement the requisite waveform expansion or spreading as necessary to generate an expanded or spread waveform that is a function of time. Expansion processing of the original baseband signal produces the expanded waveform 806 that is now a function of time, $f(t)$. This function of time is of course dependent upon the particular transform function associated with the expander 804, and can be continuous or non-continuous, monotonic, linear, non-linear or any combination thereof so long as the resultant waveform can be represented as a function of time. Once the waveform has been expanded such that it can be represented as a function of time, it can then be synchronized and mixed as shown in block 808 with a notching function 810 in the time domain using well known mixing and/or switching techniques and the like. The time domain notching function 810 is seen to have frequency band notches centered at 900 MHz and 1900 MHz as well as distinct frequency notches at two GPS frequencies according to one embodiment. Subsequent to time domain notching, a baseband waveform 812 is seen to possess the desired transmission characteristics comprising a waveform that is a function of time in which desired frequencies and frequency bands have been successfully excised from the baseband waveform 812. The baseband waveform 812 can then be amplified 814 and transmitted via an antenna 816 to one or more receivers configured to compress the expanded baseband waveform 812 using appropriate inverse chirp generators and the like well known to those skilled in the mixed signal art such that the original baseband waveform having the desired frequencies precisely excised can be recovered.

Figure 9:
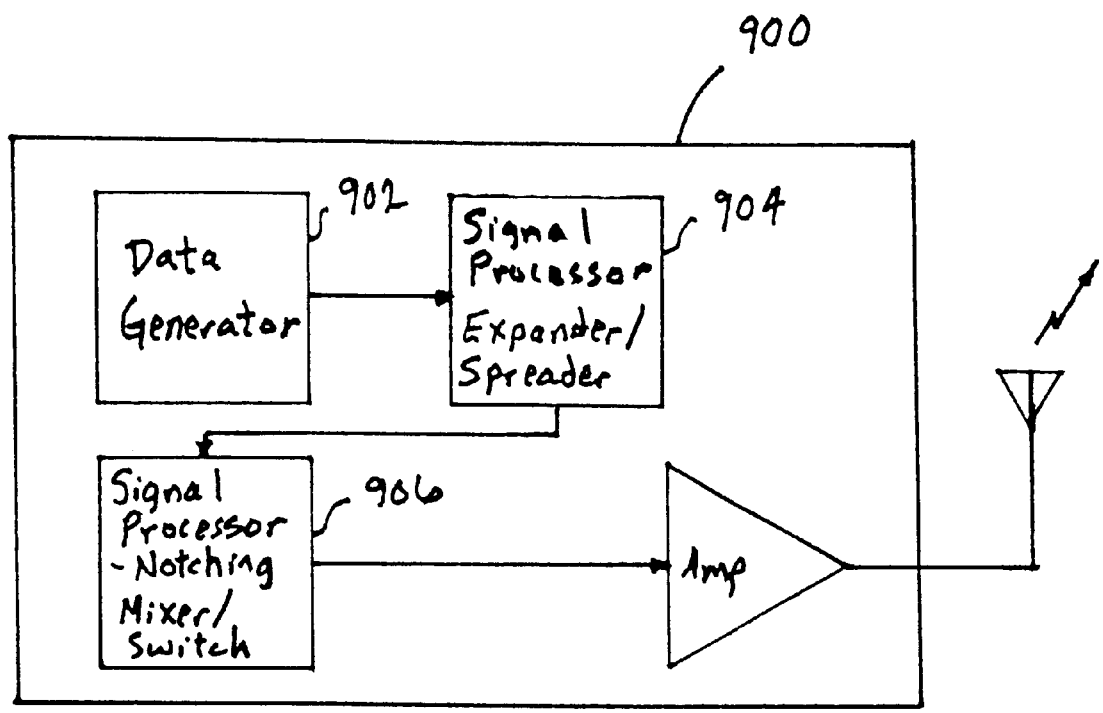
FIG. 9 depicts a transmitter configured to generate an ultra-wide band communication signal according to one embodiment of the present invention.

In summary explanation of the above, a low-cost, low-power, ultra-wide band communication system is provided that is particularly suitable for use in association with video applications. A camcorder using the ultra-wide band communication system to communicate with its associated tape mechanism, or a camcorder using the ultra-wide band communication system to communicate with a television set exemplify such video applications. Such applications would be possible since ultra-wide band communications minimizes potential interferors as well as the effects of objects normally associated with signal losses due to reflections and the like that often degrade the baseband signal. The present invention provides a significant advancement in the present art since it affords a cost effective and power saving time domain technique to achieve excision of unwanted signal frequencies from a baseband waveform without use of expensive and lossy frequency notching techniques. A transmitter 900 configured to generate an ultra-wide band communication signal according to one embodiment of the present invention is illustrated in FIG. 9. The transmitter 900 is configured for generating a baseband signal via a data generator 902 in the frequency domain and has a first signal processor 904 configured to process the baseband signal to generate an ultra-wide baseband signal having a desired bandwidth in which frequency is a function of time. The transmitter 900 further has a second signal processor 906 configured for notching the ultra-wide baseband signal in the time domain to generate an ultra-wide band output signal having desired signal frequencies precisely excised from the expanded baseband signal.

This invention has been described in considerable detail in order to provide those skilled in the wireless communication art with the information need to apply the novel principles and to construct and use such specialized components as are required. In view of the foregoing descriptions, it should be apparent that the present invention represents a significant departure from the prior art in construction and operation. However, while particular embodiments of the present invention have been described herein in detail, it is to be understood that various alterations, modifications and substitutions can be made therein without departing in any way from the spirit and scope of the present invention, as defined in the claims which follow. Although the present invention has been described in association with particular transformation characteristics and particular frequency conditions, for example, the present invention can be implemented using any transformation functions that can be represented as a function of time and that can be applied in periodic form to transform frequency waveforms to time domain waveforms. Those skilled in the art of wireless communication will appreciate that the principles of the invention described and claimed herein also apply to wireless communications throughout the world, although the various embodiments described herein are exemplified using domestic signal characteristics. Further, the exemplary expansion methods of the present invention can be implemented in hardware or software, or a combination of both. In a preferred embodiment, the functions of a data communication system designed in conformance with the principals set forth herein are implemented as one or more integrated circuits using a suitable processing technology, e.g., CMOS, HBT.

As another example, at least portions of the present invention may be implemented in computer programs, i.e. algorithms, executing on programmable baseband computers each comprising a data processor, e.g. DSP, a data storage system, including both volatile and non-volatile memory and/or data storage devices, at least one input device, e.g. A/D converter, and at least one output device, e.g. D/A converter. Program code is applied to input data to perform the functions described herein and generate output information. The output information is applied to one or more output devices, in known fashion. Each such program may be implemented in a high level procedural or object oriented programming language to communicate with a baseband computer system. However, the programs can be implemented in assembly or machine language, if desired. In any case, the language may be a compiled or interpreted language. Portions of the inventive structure and method may also be considered to be implemented as a computer-readable storage medium, configured with a computer program, where the storage medium so configured causes a data processor to operate in a specific and predefined manner to perform the functions described herein. An example of one such type of data processor is a digital signal processor (DSP).

What is claimed is:

1. A method for generating ultra-wide band communication signals comprising the steps of:
   (a) generating a baseband signal in the frequency domain;
   (b) processing the baseband signal to generate an ultra-wide baseband signal having a desired bandwidth in which frequency is a function of time; and
   (c) notching the ultra-wide baseband signal in the time domain to generate an ultra-wide band communication signal having desired signal frequencies precisely excised from the expanded baseband signal.

2. The method according to claim 1 wherein the step of processing the baseband signal comprises expanding the baseband signal.

3. The method according to claim 1 wherein the step of processing the baseband signal comprises spreading the baseband signal.

4. The method according to claim 1 wherein the step of notching the ultra-wide baseband signal comprises generating a desired time domain waveform.

5. The method according to claim 4 wherein the step of notching the ultra-wide baseband signal further comprises synchronizing the desired time domain waveform with the ultra-wide baseband signal.

6. The method according to claim 5 wherein the step of notching the ultra-wide baseband signal further comprises multiplying the synchronized desired time domain waveform by the ultra-wide baseband signal.

7. The method according to claim 1 wherein the step of notching the ultra-wide baseband signal comprises switching the ultra-wide baseband signal off and on at desired times such that baseband signal frequencies occurring at specific times are precisely excised from the expanded baseband signal.

8. An ultra-wide band communication system comprising:
   a baseband communication signal transmitter configured for generating a baseband signal in the frequency domain, the transmitter having a first signal processor configured to process the baseband signal to generate an ultra-wide baseband signal having a desired bandwidth in which frequency is a function of time, the transmitter further having a second signal processor configured for notching the ultra-wide baseband signal in the time domain to generate an ultra-wide band communication signal having desired signal frequencies precisely excised from the expanded baseband signal.

9. The ultra-wide band communication system according to claim 8 wherein the first signal processor is an expander.

10. The ultra-wide band communication system according to claim 8 wherein the first signal processor is a spreader.

11. The ultra-wide band communication system according to claim 8 wherein the second signal processor comprises a time domain signal generator.

12. The ultra-wide band communication system according to claim 11 wherein the second signal processor further comprises a synchronizer.

13. The ultra-wide band communication system according to claim 12 wherein the second signal processor further comprises a mixer configured to multiply an expanded baseband signal by a time domain signal that is synchronized with the expanded baseband signal.

14. The ultra-wide band communication system according to claim 8 wherein the second signal processor comprises a switching device configured to switch an expanded baseband signal on and off at specific times such that specific frequencies associated with specific off times are precisely excised from the expanded baseband signal to generate a desired ultra-wide baseband communication signal.

15. A method of generating an ultra-wide band communication signal comprising the steps of:
   (a) generating a first stream of data within a band of frequencies;
   (b) expanding the first stream of data to generate a second stream of data in which data generated at each frequency within the band of frequencies is uniquely associated with a specific unit of time; and
   (c) notching the second stream of data at desired units of time to precisely excise data at specific frequencies necessary to generate a desired ultra-wide band communication signal.

16. The method according to claim 15 wherein the step of notching comprises generating a time domain signal.

17. The method according to claim 16 wherein the step of notching further comprises synchronizing the time domain signal with the second stream of data.

18. The method according to claim 17 wherein the step of notching further comprises mixing the synchronized time domain signal with the synchronized second stream of data.

19. The method according to claim 15 wherein the step of notching comprises switching the second stream of data on and off at specific times.

20. A method of generating an ultra-wide band communication signal comprising the steps of:
   (d) generating a first stream of data within a band of frequencies;
   (e) spreading the first stream of data to generate a second stream of data in which data generated at each frequency within the band of frequencies is uniquely associated with a specific unit of time; and
   (f) notching the second stream of data at desired units of time to precisely excise data at specific frequencies necessary to generate a desired ultra-wide band communication signal.

21. The method according to claim 20 wherein the step of notching comprises generating a time domain signal.

22. The method according to claim 21 wherein the step of notching further comprises synchronizing the time domain signal with the second stream of data.

23. The method according to claim 22 wherein the step of notching further comprises mixing the synchronized time domain signal with the synchronized second stream of data.

24. The method according to claim 20 wherein the step of notching comprises switching the second stream of data on and off at specific times.

25. A system for generating an ultra-wide band communication signal, the system comprising:
   means for generating a second stream of data within a second band of frequencies from a first stream of data within a first band of frequencies such that the second stream of data is generated over a wider band of frequencies than that occupied by the first stream of data and further such that each frequency associated with the second stream of data is associated with a unique unit of time; and means for notching the second stream of data at specific units of time to generate an ultra-wide band communication signal in which data generated at specific frequencies within the second band of frequencies is precisely excised from the second stream of data.

26. The system according to claim 25 wherein the means for generating a second stream of data comprises an expander.

27. The system according to claim 25 wherein the means for generating a second stream of data comprises a spreader.

28. The system according to claim 25 wherein the means for notching comprises means for generating a time domain signal.

29. The system according to claim 28 wherein the means for notching further comprises means for synchronizing the time domain signal with the second stream of data.

30. The system according to claim 29 wherein the means for notching further comprises means for mixing the synchronized time domain signal with the synchronized second stream of data.

31. The system according to claim 25 wherein the means for notching comprises a switching device configured to switch the second stream of data on and off during specific units of time.

* * * * *